2 Sheets—Sheet 1.
J. H. PIERSON.
MACHINE FOR HEADING SCREWS, &c.
No. 108. Reissued Mar. 8, 1848.
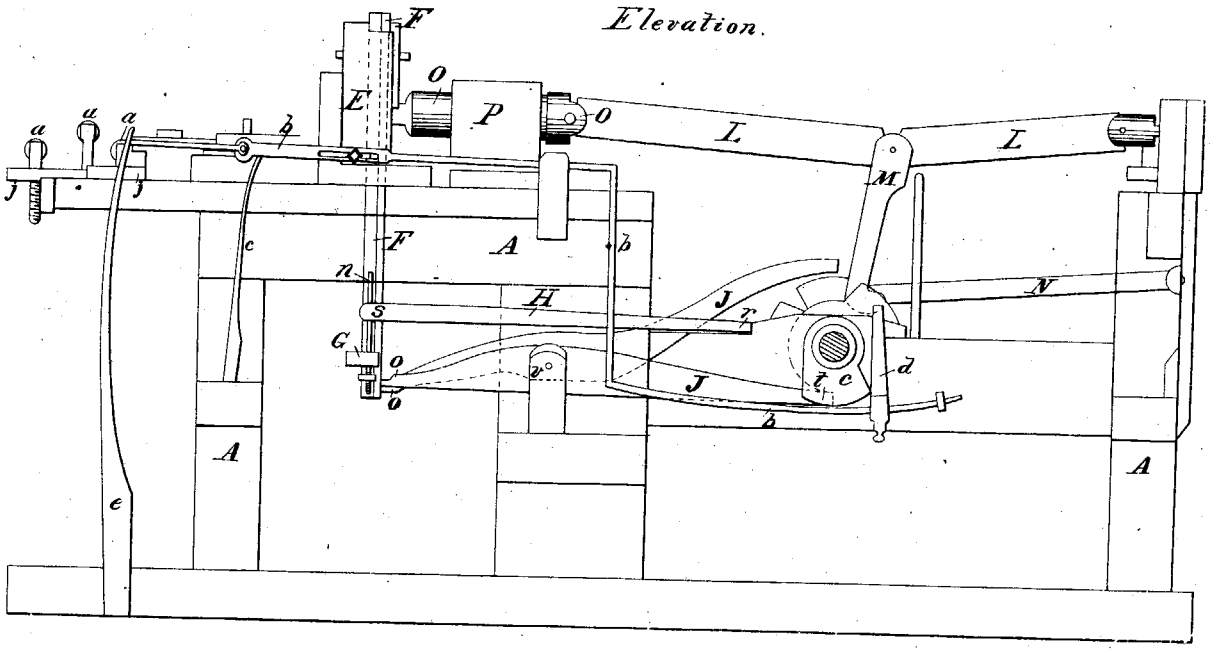

J. H. PIERSON.
MACHINE FOR HEADING SCREWS, &c.
No. 108.
Reissued Mar. 8, 1848.
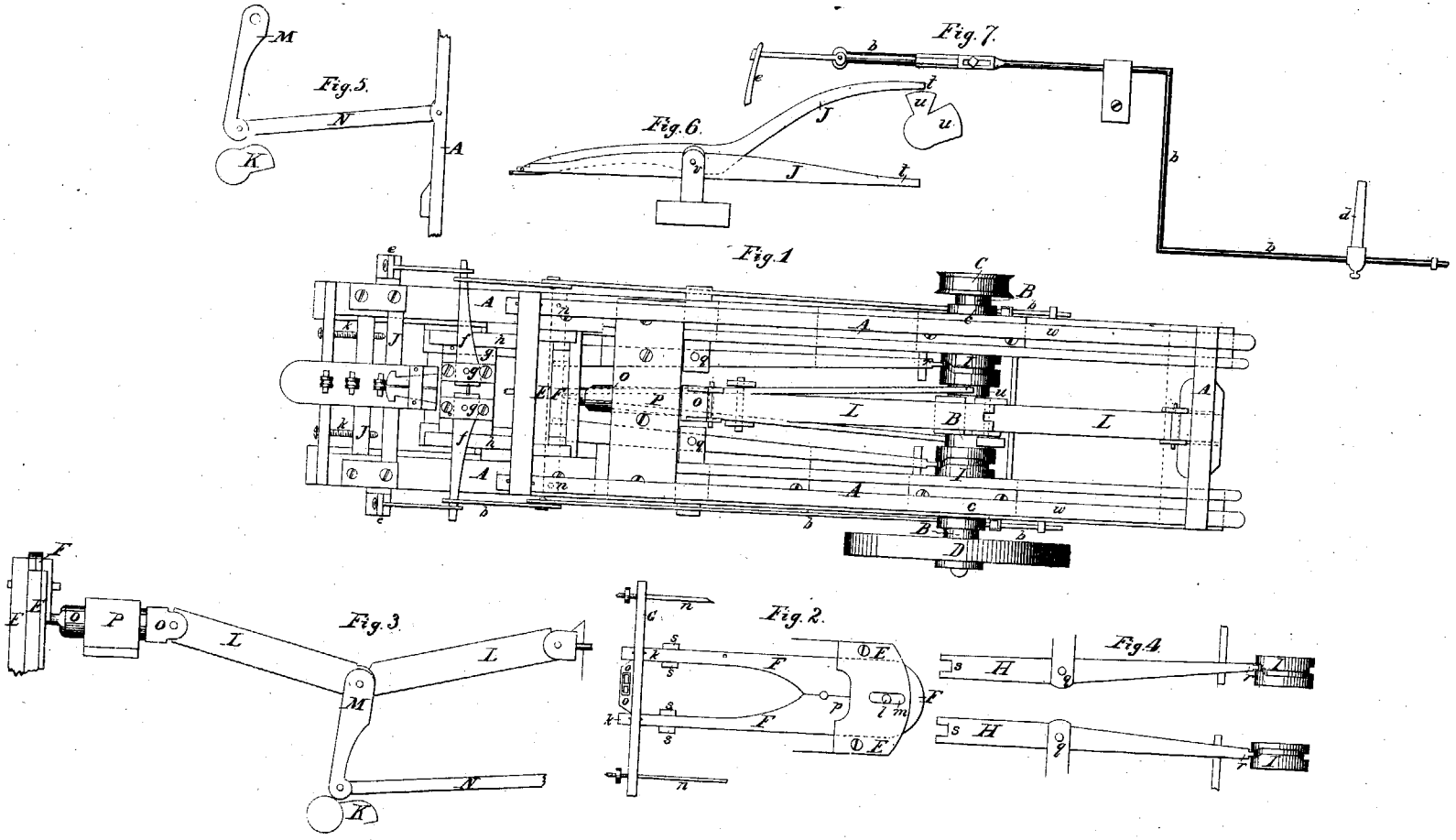

UNITED STATES PATENT OFFICE.

HENRY L. PIERSON, OF RAMAPO, NEW YORK, ASSIGNEE OF JEREMIAH H. PIERSON, OF SAME PLACE.

MACHINE FOR CUTTING AND HEADING WIRE FOR MANUFACTURING WOOD-SCREWS AND RIVETS.

Specification forming part of Letters Patent No. 86, dated November 26, 1836; Reissue No. 108, dated March 8, 1848.

*To all whom it may concern:*

Be it known that JEREMIAH H. PIERSON, of Ramapo, in the county of Rockland and State of New York, did invent a new and useful machine for cutting wire into suitable lengths, and for heading the wire or blank so cut for the purpose of manufacturing wood-screws and rivets; and I do hereby declare that the following is a full, clear, and exact description of the principle or character which distinguishes it from all other things before known, and of the manner of making, constructing, and using the same, reference being had to the accompanying drawings, making part of this specification, in which—

Plate No. 1 gives an elevation of the machine on one side, and Figure 1 in Plate No. 2 a plan or top view. The other figures on this plate show such parts in detail as it is thought necessary to represent.

In the drawing No. 1, the frame A is represented by red lines, which are not allowed to interfere with a view of those parts within it which would be in view were it removed. They are not, therefore, drawn in dotted lines.

The nature of the said JEREMIAH H. PIERSON'S invention consists in gripping that part of the wire which is to be formed into a screw-blank or a rivet by means of jaws, and then sliding these jaws along or by and in contact with the surface of a rest-plate (through a hole in which plate the wire is fed) to cut off the length required, the one edge of the gripping-jaws and the hole in the plate constituting shears for cutting the wire, and by this motion carrying the end of the piece of wire cut off sufficiently far to rest against the rest-plate, which is a permanent part of the machine, preparatory to striking up the head. In this way the piece of wire that is to be headed is, after being cut off, held firmly in the gripping-jaws, while the end which is to form the point of the screw-blank or rivet rests against a solid part of the machine which will not yield to the action of the header, while at the same time the jaws that hold the piece of wire are, by the action of the header, forced with the wire against the face of the rest-plate, thus avoiding the possibility of striking up the wire and forming a burr on that end of the wire which is to constitute the point of the screw-blank or rivet, the forming of which burr would not only be a defect in the screw-blank or rivet, but which would impede the delivery of it from the jaws. This difficulty, thus avoided, will be found to exist when the wire to be headed is cut off by the motion of the rest against which the wire is to bear when under the action of the header, for to admit of moving the rest it must have more or less play, and if the jaws be permanent and the rest movable when the header strikes the wire is forced through the gripping-jaws against the rest, which, by reason of being movable, and therefore having some play, yields to this pressure, and thus the wire is upset and has a burr formed on it.

The coil of wire from which the blanks are to be cut is placed on a reel and is straightened as it enters the machine by passing between the straightening-rollers *a a a*. The wire is drawn into the machine, cut off, and headed by the action of cams and eccentric grooves upon levers which guide and control the apparatus used for these purposes in a way to be now described. A main shaft, B, revolving in suitable boxes, is turned by means of a band passing round the whirl or pulley, C, or by any suitable gearing, and on the opposite end of this shaft there is a fly-wheel, D, which is not shown in the elevation, (Drawing No. 1,) as it would obscure parts which it is important to show.

The wire is drawn into the machine by means of rods *b b b*, (shown separately in Fig. 7,) which are acted upon by the cams *c c* on the outside of the frame, the cam, as shown in Drawing No. 1, pressing as it revolves against the vertical arm *d*, which is adjustable on the rod by means of a tightening-screw. A similar cam and rod are placed on the opposite side of the machine. The rod is strengthened by oblique braces to give it the requisite stiffness; but these braces are not shown in drawings. A reacting-spring, *e*, is used to draw the rod back when not held by the cam. The nippers *f f* seize the wire and draw it forward to the extent desired by the action of the rod *b b*. The wire passes through a hole in the rest-plate or head-block E, where it is cut off by the motion of gripping-dies, to be presently described. The nippers *f f* rest and have their fulcra upon a sliding plate, *g g*, the ends of which move freely in grooves under the plates *h h*. The wedges *i i* hold the wire in its place, ready to be drawn forward by the nippers *f f*. They are closed upon the wire by the retracting of the nipper-plate, which is thereby brought into contact with them, and when the wire is drawn forward by the nippers the wedges are thereby loosened. The wedges and the straightening-rollers are affixed to the same sliding frame, *j j*, which is adjusted by the set-screws *k k*, that the wedges may be correctly operated upon by the nipper-plate. To cause this plate to slide back when not held forward, a spring similar to those at *e e* rises from the middle of the frame and acts upon the under part of it. This spring is seen at *e'* in the elevation. The head-block E contains the gripping-jaws, which open and close and slide up and down within it. The head of these gripping-jaws is seen at F, Plate 1, and in Plate 2, Figs. 1 and 2, the opening or mortise within which they slide being designated by the continuous line surrounding that letter, and also at E, Fig. 2. In this figure that side of the head-block E which is toward the heading-die is shown. The shanks of the gripping-jaws extend down through the cross-bar G, the mortises in this cross-bar, through which they pass, allowing them to open and close to the requisite distance; but the jaws rise and fall with the rising and falling of this bar, having checks or notches which bear against its upper and lower sides, as shown by the pins *k k*.

*l* is the joint-pin of the jaws, which projects into and slides in a slot, *m*, through either side of the head-block, thus serving to guide it up and down.

*n n* are guide-rods to guide the bar G, and O O are mortises or openings which receive the ends of the levers, by which it is raised and lowered at the proper period.

The jaws are represented as closed, and the gripping-dies are to be properly adapted to the purpose by having their edges toward the rest-plate adapted to the cutting of the wire by being made sharp for this purpose, while on the other face they are countersunk or otherwise adapted to the formation of the head of the blank or rivet. When the wire is fed in, it passes between the dies of the jaws which are then open and opposite to the hole through which the wire passes in front of the head-block. When the wire has been drawn in, the jaws are closed, and it is cut off by the jaws being then raised, the dies in the jaws and the hole in the rest acting as shears, and the wire is carried up, so as to bring its projecting end opposite to the heading-die, while the opposite end rests against a solid part of the rest-plate or head-block, which is there formed of steel to sustain and resist the pressure of the heading-die. When the heading is completed, the jaws again descend, and a new piece of wire, being fed in, pushes the headed blank or rivet out and occupies its place.

For ordinary blanks the opening is countersunk or otherwise made to form the under side of the head, in the usual manner.

The levers *h h*, Fig. 4, serve to open and close, the tongs *q q*, being their fulcra, the ends *r r* being guided by the zigzag grooves in the wheels I I on the main shaft B, as shown also in Fig. 1. The notches at their ends *s s* embrace the shanks of the tongs, which slide up and down freely within them.

The levers J J, Fig. 6, are for raising and lowering the tongs, their ends *t t* being alternately acted upon by the cams *u u*, seen in place on the shaft B in Fig. 1. Their ends *o o* pass into the mortises *o o* in the rail of the tongs. Their fulcra are at *v* in a standard placed to receive them.

When the wire has been cut and the tongs raised so as to present its projecting end to the heading-die, a cam, K, Figs. 3 and 5, on the center of the shaft B raises the progressive levers or toggle-joint L L by its coming into contact with the lower end of the descending joint-piece M. A guide-piece, N, is jointed to M and to the frame, to govern the motion of the toggle-joint.

O is a sliding bolt passing through the socket-head P, and carrying the heading-die, which is to be either flat or hollow, according to the form to be given to the head of the blank. There are iron braces extending from the front head-block, E, to the back end of the frame, to bind them together and sustain them against the force of the toggle-joint in the heading process. These are shown in top view, Fig. 1, and are marked *w w;* but they are omitted in the elevation in order to afford a clearer view of the working parts. A machine of this kind will vary so materially in size and in the proportion of its parts, according to the size of the blank to be cut and headed, that it is deemed superfluous to give any scale or estimate of these; nor will they be found necessary by any competent machinist, who would not fail to construct it with the requisite strength, which is the main point in these particulars.

From the foregoing it will be seen that this machine may be variously modified without changing the principle or mode of operation of the invention, as the piece of wire to be formed into a screw-blank or rivet can be cut off by the sliding of the gripping-jaws either horizontally, vertically, or diagonally, and that any known mechanical equivalents may be substituted for the levers, cams, &c., employed to give the required movements to the jaws for gripping the wire and cutting it off.

What I claim as my invention, and desire to secure by Letters Patent, is—

1. Cutting off the wire to be formed into a screw-blank or rivet by the sliding of the gripping-jaws after the wire has been gripped by them, when this is combined with the permanent rest-plate or head-block through which the wire is fed to the jaws, which acts as the permanent shear for cutting off the wire, and as the permanent rest or bed for the blank or rivet when under the operation of the header, substantially as described.

2. The mode of feeding in the wire, combining the action of the nippers and their sliding plate with their wedges for holding the wire, and their adjustments, substantially as described.

HENRY L. PIERSON.

Witnesses:

EDWARD F. HOPKINS,
GEORGE L. NICHOLS.